: 2,928,812

HYDROXYALKYL CARBAMATE-FORMALDEHYDE CONDENSATION PRODUCTS

Robert Ernst, Los Angeles, Calif.

No Drawing. Application October 2, 1953
Serial No. 383,939

18 Claims. (Cl. 260—67.5)

This invention relates to polymeric hydroxyalkyl carbamate ester-formaldehyde condensation products. By polymerization of such hydroxyalkyl carbamate-formaldehyde condensation products I obtain water soluble polymers which are infinitely dilutable with water and which are stable water dispersions without gelation over prolonged periods of time.

Such dispersions may be dehydrated. I have obtained in this manner colorless, tough, rubbery thermoplastic solids which can be applied as hot melts or cast from water or alcohol solutions. Some are pressure sensitive adhesives. I have also obtained viscous liquid resinous products particularly useful as plasticizing agents.

I have also found that I may inter-condense hydroxyalkyl carbamate-esters formaldehyde and urea and thus obtain modified urea-formaldehyde resins of useful properties.

As is well known, monomethylol and dimethylol urea have long been used in the production of crush-resistant resin finishes on fabrics. These compounds form crystalloid solutions in water and therefore penetrate the fibers well and cause generally soft, pliable finish.

Where a firmer hand or a full-bodied finish is desired, resins forming colloidal solutions are employed. For such purposes, partially polymerized urea formaldehyde resins have been used. Where simple pre-polymerized urea-formaldehyde resins are used, these have to be prepared immediately before application, since water dispersions tend to gel and separate from the water on standing, and rapidly so at an acid pH.

When first formed by reaction of urea and formaldehyde a water solution or dispersion of the primary urea formaldehyde is formed, but this dispersion in time gels and settles, particularly when further diluted with water or when concentrated or heated. The instability of the urea-formaldehyde condensation product is a severe limitation on its utility.

I have found that the hydroxyalkyl esters of carbamic acid constitute excellent resin building intermediates for the advancement of the above mentioned art.

I have found that the water dispersible preliminary polymerization stage of the urea condensation products may be stabilized against separation from water dispersion and gelation and may be made infinitely dilutable with water by forming a co-reaction product comprising a formaldehyde-hydroxyalkyl carbamate condensation product and a urea-formaldehyde condensation product.

The hydroxyalkyl carbamates which I have found useful for these purposes of my invention are those having the following structural formula:

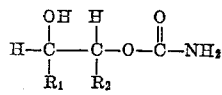

where the total carbon in the ester radical is at least two and not more than three and $R_1$ and $R_2$ are radicals chosen from the group consisting of H, methyl ($CH_3$) or methylol ($CH_2OH$) radicals.

The following compounds illustrate the carbamate useful for my invention:

Hydroxyethyl carbamate—

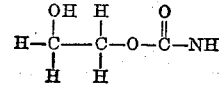

Hydroxymethyl methyl carbamate (2 hydroxyethyl carbamate).

Hydroxy propylcarbamate, to wit:

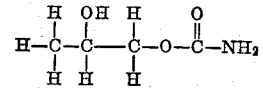

(2 hydroxy propyl carbamate)

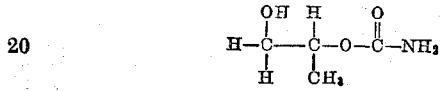

1 methyl-2-hydroxy ethyl carbamate

Glyceryl carbamate, to wit:

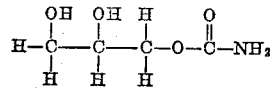

2-3 dihydroxy propyl carbamate or

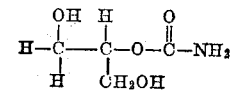

Hydroxymethyl-2-hydroxy ethyl carbamate or mixtures of the above compounds.

I may form water dispersible polymeric formaldehyde condensation products of these hydroxyalkyl carbamate esters by reacting the esters with formaldehyde. I may thus produce stable water dispersions of these condensation products which may then be converted by heat or catalyst into solid thermoplastic polymers or into viscous forms thereof, all of which are water dispersible to give clear dispersions in the nature of solutions.

I may also, by co-reacting the formaldehyde and hydroxyalkyl carbamates with urea, or co-reacting the partially polymerized hydroxyalkyl carbamate-formaldehyde condensation products with urea or with partial condensates of urea and formaldehyde, form modified polymers having thermoplastic properties which give stable water dispersions or form thermosetting resins, depending on the ratio of the carbamate to the urea in the co-reaction product.

This may be accomplished either by interpolymerizing urea admixed with the hydroxyalkyl carbamate with the formaldehyde or by admixing in the primary stage of the formaldehyde-urea condensation product the hydroxyalkyl carbamate together with additional formaldehyde, if insufficient formaldehyde is present in excess in the urea formaldehyde condensation product. I may also form a partial polymer of the hydroxyalkyl carbamate and formaldehyde and then introduce either urea or the partially polymerized urea-formaldehyde condensation product having present sufficient formaldehyde for this reaction.

I have found that when the ratio of urea to the hydroxyalkyl carbamate used to form the inter-condensation product is about 0.02 mol of hydroxyalkyl carbamate or is in greater proportion to the urea than 0.02 of carbamate to 1 mol of urea (as, for example, 1 mol of hydroxyalkyl carbamate to 1 mol of urea or in greater proportion to the urea), the water dispersions of the inter-condensation product has an enhanced stability compared to the stability of the simple urea-formaldehyde condensation product which is one of the characteristics of the polymers of my invention. Using less than 0.02 mol of the hydroxyalkyl carbamate to 1 mol of urea will not produce a polymer having the properties of my invention in any substantial degree. Not only is the stability of the water dispersion of the inter-polymer in storage greater than that of the urea-formaldehyde condensation polymers, but the dispersion may be diluted without precipitation.

These and other properties distinguish the product from the simple urea-formaldehyde condensation product, as is herein more fully set forth.

The reaction products of formaldehyde and hydroxyalkyl carbamates using approximately 1 mol or in excess of 1 mol of hydroxyalkyl carbamate per mol of urea yield resin substances which are water soluble in nature, thermoplastic, and are generally not heat convertible, i.e., thermosetting.

As the ratio of urea to the hydroxyalkyl carbamates increases, the resins become less thermoplastic and begin to exhibit thermosetting characteristics. Thus, for example, when the ratio of the urea to hydroxyalkyl carbamate is greater than approximately 1:1, the resins on evaporation of the water solution and the water of reaction are thermosetting, become firm, and substantially insoluble in water.

The resultant inter-polymers produced by the reaction contain urea units, alkanol carbamate units, and formaldehyde residues. The ratio of the alkanol carbamate radical forming the alkanol carbamate units to the urea radical forming the urea units will depend upon the mol ratio of the urea and of the alkanol carbamate used in the reaction. Thus the ratio of the alkanol carbamate units to the urea units may be 0.02 to 1, or I may increase the mol ratio to 1:1 or above 1:1, and as stated above may omit the urea units entirely, to produce polymers having the properties as stated above.

The primary condensation product as well as the further polymerized and dehydrated condensate containing the alkanol carbamate units and formaldehyde residues, forms stable water dispersion and may be infinitely diluted to form stable water dispersions. As stated above, such resins and/or such resins properly modified with urea to contain a ratio of urea units to hydroxyalkyl carbamate units of 1:1 or less than 1:1, form thermoplastic viscous liquid or solid condensation polymer resins on further polymerization and drying and dehydration by removal of water in the process of poly-condensation.

If urea units are incorporated by inter-condensation of the urea and of the alkanol carbamate with formaldehyde so as to produce a polymer having a mol ratio of urea radical to hydroxy carbamate radical ranging from greater than approximately 1:1 up to approximately 50:1, the water dispersions of the inter-polymer are, as described above, stable and may be diluted without separation of the condensate. The water dispersions of such intercondensation polymers, as described above, can be converted by further dehydration into infusible insoluble resinous bodies.

The hydroxyalkyl carbamate modified with the urea formaldehyde condensation resins of my invention may be generally characterized as urea-hydroxyalkyl carbamate-formaldehyde condensation inter-polymers or co-reaction products containing urea units, hydroxyalkyl carbamate units and formaldehyde residues. While I do not wish to be bound by any theory of the structure of the products of my invention, this characterization is believed proper by reason of the fact that the properties produced by the reactions described herein are consistent with a cross linkage between the hydroxyalkyl carbamate-formaldehyde condensation product and the urea-formaldehyde condensation product and not like simple mixtures of the formaldehyde condensation product and the carbamate formaldehyde condensation product.

Hydroxylethyl carbamate is readily produced according to the method described below:

Example 1

Into a 500 mm. 3-neck flask equipped with stirrer reflux condenser, thermometer, and funnel, is charged 4.8 moles of aqueous 28% ammonia, i.e., a total of 291.2 grams. There is then added, over a period of approximately 1½ hours under agitation, a total of 4 moles, equal to 352 grams, of ethylene carbonate (dioxolone-2). The ethylene carbonate used was a commercially available grade, having a refractive index of $$\frac{40}{D} - 1.4190$$

boiling point of 243–244° C. and was of a purity greater than 98%. The reaction is mildly exothermic and the addition should therefore be regulated to prevent excessive temperature development which would vaporize the ammonia contained in the reactor and result in an incomplete reaction.

In the above example, the maximum temperature during addition was held below 100° F. After the complete addition, the clear solution was stirred for several hours at approximately 80–90° F., and the total transferred to a vacuum distillation unit. An acid solution scrubber is placed between the vacuum pump and distillation unit to trap the excess ammonia vapors coming off during the distillation. Excess ammonia and water were then distilled off at reduced pressure, ranging from 100 mm. to 80 mm., at liquid temperatures of from 124–140° F., and vapor temperatures of from 105–120° F., at the top of the reflux column. At the end of the distillation, the internal temperature rose sharply to 200° F. over a period of 20 minutes, with the vapor temperature dropping off radically, as no more volatiles were collected, even by reducing the pressure to 50 mm.

The resultant product is colorless, and practically an odorless liquid. Yield obtained was greater than 99% of theory. Nitrogen was determined according to the method of Kjeldahl. Theory, 13.3% N; found, 13.2%.

Example 2

The hydroxy propyl carbamate was made in a like manner, using 5 moles of ammonia in the form of a 28% solution, and 4 moles of propylene carbonate (4-methyl dioxolone-2). The propylene carbonate used had a refractive index $n_D^{20}$, 1.4209, boiling point of ° C. (760 mm.) 241.7, and is readily obtainable commercially.

In this instance, the carbonate was added to the aqueous ammonia of the same concentration as was used in Example 1, over a period of 1–1.2 hours, cooling the flask in a water bath, and then was permitted to remain overnight, or for 14 hours, after which the total was transferred to the vacuum distillation apparatus as described before, and water and excess ammonia removed at 75 mm. pressure, at a liquid temperature of 122–154° F., and vapor temperature of 105–120° F. at top of the reflux column. The reaction mass was permitted to rise to 190° F. at 75 mm. pressure in finishing up the distillation.

The batch was cooled and nitrogen determined by the Kjeldahl method. Theory, 11.8% N; found, 11.6%.

Example 3

The glyceryl carbamate was produced in an identical manner as indicated for the hydroxyethyl carbamate. The glyceryl carbonate used in forming the glyceryl carbamate was prepared by trans-esterification, using propylene carbonate and freshly distilled glycerine. This reaction was carried out at temperatures and pressures which will distill propylene glycol. Pressures of approximately 30–40 mm. and temperatures of 220–300° F. were used to eliminate the propylene glycol as the by-product. A catalyst was not required.

An alternative method involves transesterification of glycerol with ethylene carbonate, utilizing a very slight excess of the latter by gradual heating over a course of 1½ hours to 290 F., under 75 mm. vacuum, then during 75 minutes at about 300° F., and 34–36 mm. vacuum, and finally until the vapor temperature drops and an approximately theoretical amount of ethyleneglycol has been collected. Care must be used in any event to prevent excessive temperatures which could lead to decomposition into glycidol. The glyceryl carbonate is then reacted with ammonia, using the procedures described in Examples 1 and 2.

The above will indicate the simplicity, high yields of the preparatory process for making the hydroxyalkyl carbamate, and high purity which are obtainable. The reaction itself is simply an addition reaction of the carbonate upon ammonia:

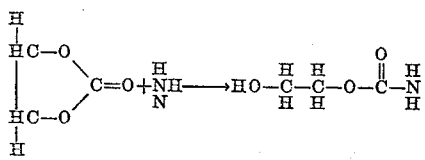

The vacuum distillation indicated herein is by no means essential. The carbamate could well be used by merely driving off the excess ammonia (which, when desired, may be re-absorbed). Although the anhydrous carbamates were utilized in all the following examples, it is understood that a correspondingly greater proportion of the aqueous dilute solution could as well be used.

I have found that the alkanol carbamate esters may be condensed with aldehydes to produce resins having useful properties. By employing urea in a major molar proportion (i.e., more than 1:1) to the hydroxyalkyl carbamate I obtain modified thermosetting resins, as described below.

Such condensation reactions take place over a wide pH range in the reaction mixture. Thus, the reaction mixture may be either alkaline or acid. However, I have found that, by keeping the reaction mixture acid preferably in the range of 3 pH to 6 pH, the condensation reaction is faster and is more complete. However, as shown below, I may use even lower pH for the final condensation to form the solid or viscous resin, particularly where the resin is thermosetting. A wide variety of organic or inorganic acids and bases may be used for adjustment of pH in a manner equivalent to those used in the following examples as will be clear to those skilled in this art from the herein description.

Preferably, also, I use at least one mol of formaldehyde for each mol of hydroxyalkyl carbamate and if I employ urea units as well, I also employ additionally one or more moles of formaldehyde for each mol of urea.

The resins formed are not cationic in nature and therefore will not reduce the light stability of substantive dyes (direct dyes) commonly used in process of dyeing cellulose fibers or fibers made of regenerated cellulose.

The following examples are for the purposes of illustration of my invention and not as limitations thereof:

*Example 4*

Formaldehyde, 9.3 moles (37%) aqueous, 753½ grams; urea, 4 moles, 240 grams; and hydroxypropyl carbamate, 0.6 moles, 71.4 grams are charged into a reactor equipped with a sealed agitator, reflux condenser, and thermometer. The pH of the above solution was adjusted to above 9 by the addition of calcium hydroxide, 0.25 grams were used, and a pH of 9.35 was obtained. The solution was stirred and brought to reflux at 206° F. and refluxed thereabout for one hour. Upon cooling, the pH was 8 and the previously clear solution turned dim and a crystalline appearing substance collected. This substance readily re-dissolved, forming a clear solution on re-heating. Upon concentrating, there was obtained a stable soft paste, resembling dimethylol urea in many respects in properties as textile finishing compounds, but being much more stable against development of methylene ureas or similar water insoluble compounds.

The diluted solution formed above and prior to concentration is now adjusted to a pH below 7 and preferably 5 or below by use of acetic acid. In this manner, a pH of 4.85 was produced and the substance was heated, employing a reflux condenser, and brought up to reflux temperature at 208–209° F. and held thereabouts for one hour to produce, upon cooling, a colorless, clear, water soluble resin, having a viscosity of 40 c.p.s. (Brookfield #1 spindle, 20 r.p.m.) and being stable at this pH over extended periods of storage.

A like resin solution, when boiled with reflux for 6–7 hours at a pH of 5 or below produced a colorless, clear, infinitely water soluble resin, having a Brookfield viscosity of 70 c.p.s. (#1 spindle, 20 r.p.m.); therefore, practically twice the viscosity of the resin mentioned before, without suffering in ability to be diluted by water.

*Example 5*

Formaldehyde, 10 moles (810 grams aqueous, 37% formaldehyde; urea, 4 mols, 240 grams; hydroxyethyl carbamate, 0.4 mols, 42 grams, were made basic by the addition of very small quantities of aqueous sodium hydroxide, bringing the pH to above 8. The total was brought to boil under a reflux condenser and while agitating, was held there for an hour. The solution was then cooled somewhat and there was added a sufficient amount of acetic acid to bring the pH to about 5. The resin was now refluxed for approximately one hour and upon cooling yielded a resin infinitely soluble in water, clear, and stable, even at pH of below 5. Viscosity after one hour of reflux was 45 c.p.s. (Brookfield #1 spindle, 20 r.p.m.).

This resin remained water soluble after 90 days' storage at room temperature. For even greater protection in storage these resins may be adjusted closer to a neutral pH after reaching the desired degree of pre-polymerization.

*Example 5A*

The resin produced as in Example 5 may be converted into a resin by modification. Thus, on lowering of the pH of such resin, for instance, by the addition of phosphoric acid to yield a pH of below 2, the viscosity commences to rise rapidly and the resin will set overnight to a water and organic solvent, insoluble, hard, clear, colorless, but not brittle solid. Such conversion into a water insoluble, clear thermosetting resin also occurs without the addition of a catalyst by the application of heat. The polymer is thus dehydrated and converted into the water insoluble clear resin.

*Example 6*

A modified resin similar in properties to resin of Example #5 was produced as follows:

To 10 moles of freshly neutralized formalin (810 gr. 37% aqueous formaldehyde) were added 4 moles urea (240 grams) and 0.12 moles hydroxyethyl carbamate (12.6 grams). The reagents were brought to reflux (approx. at 208° F.) for 30 minutes and acidified, after cooling back to about 160° F., by addition of 1 gram formic acid to bring the pH below 6. A pH of 5.0 resulted and the solution was heated once more to reflux and maintained there for one hour in one case and 5 hours in an alternate case. The solution having been refluxed for 5 hours showed markedly greater body than the one refluxed for one hour and resulted in a viscosity of 85 c.p.s. as measured on a Brookfield viscosity meter. The resins as produced were clear and colorless and gave instant dilute solutions when poured into water, without any sign of precipitation. These resins may be neutralized after reaction to hold the desired viscosity. Subsequent acidification within the range mentioned will however not precipitate them, so that they may be applied at the acid side.

Examples 4, 5 and 6 yield hydroxyalkyl carbamate modified urea-formaldehyde resins containing minor portions of hydroxyalkyl carbamate units and a major proportion of simple urea units give stable aqueous solutions, dilutable with water without limitation, yielding clear, dilute solutions for application to paper or fabrics. Such solutions show excellent resistance to coagulation and precipitation over a wide pH range, yet are readily converted into insoluble, thermosetting, glass-like, colorless resin films and masses, upon elimination of the water of solution and condensation, through heat, catalysts or both.

A resin, such as the one in Example 4, 5 or 6, but replacing all of the hydroxyalkyl-carbamate with simple urea and otherwise processed in an identical manner, would result in a resin solution which turns cloudy when poured into water, or otherwise diluted with water, forming a white precipitate rapidly. Lacking water solubility, settling out occurs. The unsuitability of such a product is immediately apparent.

The following will demonstrate a typical application of the resins described in Examples 4, 5 and 6.

Example 7

20 volumes of resin of Example 5 are diluted with 80 volumes of water (cold or tepid water may be used). A butcher linen fabric of viscose rayon was run through this solution and subsequently through the "Padder Rollers" to remove the excess solution. A wet weight increase of 80% was obtained. The fabric was then dried and heated for a period of 5 minutes at 310° F. A crisp, heavy-bodied finish resulted with good resistance to creasing and washing. It is particularly suited for slack suits and similar garments where a firmer "hand" is required. The absence of an acid-acting catalyst not only proved this treatment kind to color and tensile strength of the fabric, but also makes the usual soaping-off or rinsing operations unnecessary, and, thereof, proves extremely labor-saving by avoiding washing and re-drying operations.

On the other hand, if desired, heat unstable, acid-acting salts, such as ammonium phosphates, ammonium nitrate, or even acids, such as gluconic acid or phosphoric acid, may be used to achieve specific results, as indicated below.

When acids or the heat unstable acid-acting salts are used, much lower temperatures of cure or drying may be utilized to set the above resins and cause them to become infusible, and obtain, in general, other desirable properties as outlined above. However, in such case rinsing is recommended. It will be noted, however, that in large scale experiments no odor development was noted, even on, heated but not rinsed, goods when utilizing phosphoric acid as a catalyst (for instance, so as to achieve a pH of 2.5 in dilute solution and drying at 275° F. without any further bake or curing procedure whatsoever). The finished fabric (a rayon and acetate gabardine) acquired, after such treatment, a springy, full-bodied finish which was readily washable.

In the example of useful resins mentioned thus far, urea in its simple form was shown as the major constituent of the resin molecule and the hydroxyalkyl carbamates as the minor portion and serve by their presence the purpose of stabilizing the resin solution against:

(1) Gelation or precipitation upon continued storage at reasonable pH range, i.e., a pH range above 2;

(2) Producing resins soluble in water and dilutable to any extent so as to form dilute solutions free of precipitates or sedimentation even at an acid pH and over a prolonged period of storage time, at least several hours to permit the intended process of impregnation of textiles or paper, for example;

(3) To yield a less brittle condensate polymer than can be obtained from simple urea and formaldehyde;

(4) To provide a resin capable of being impregnated into fibers or paper at an acid pH without danger of precipitation and consequent staining and spotting and capable of being converted into the insoluble state by simple drying operations and without the customary exposure to baking temperatures required to set conventional resins. For example, at temperatures such as are, for instance, required to decompose neutral or slightly alkaline ammonium salts of mineral acids, and generally in use to furnish the acid catalyst upon volatilization of the base.

As has been pointed out, resins such as are demonstrated in Examples 4, 5 and 6 are thermosetting in nature and can be converted to the water-insoluble state. With increasing ratios of hydroxyalkyl carbamates to simple urea, the thermosetting properties of the resulting formaldehyde resins give way to thermoplastic properties, and resins may be produced which are permanently thermoplastic and permanently water-soluble even upon exposure to high temperatures and acid condition. Such resins are equally useful for applications other than indicated for the thermosetting variety.

Several examples to follow will indicate the methods which may be used. These include reacting formaldehyde, the hydroxyalkyl carbamates by themselves without employing urea or by using urea in a minor proportion compared to the hydroxyalkyl carbamates.

Example 8

Into a 3-neck flask, equipped with sealed agitator, thermometer, and reflux condenser were charged: aqueous (37% by weight) formaldehyde, equal to 9 moles, 729 grams; 2-hydroxyethyl carbamate, equal to 5 moles, 525 grams; glacial acetic acid, approximately ¾% by weight of total, 9 grams. The reactants were brought up to reflux temperature and maintained there for approximately one hour. Reflux temperature was 212° F. The equipment was then adjusted for distillation and heating continued until about 485 to 500 cc. distillate had been collected. At this point, the batch temperature had risen to about 255° F. to 260° F.

A very viscous, clear, resinous syrup resulted, having a viscosity of 37,800 to 38,000 cps. (measured on a Brookfield Synchrolectric Viscosimeter No. 7 spindle, 20 r.p.m., at 24° C.). Higher viscosities can be obtained by prolonged heating, by finishing off at higher temperatures or by application of vacuum toward the end of the distillation, to force additional condensation. By this method, a more odorless product is produced.

Example 9

Into a reactor, equipped as in Example 8, were charged: Formaldehyde, 37% aqueous, equal to 7 moles, 567 grams; hydroxypropyl carbamate, equal to 3 moles, 351 grams; simple urea, equal to 2 moles, 120 grams. The resultant solution was acidified with approximately ¾% to 1% glacial acetic acid on the total weight of charge, and the charge brought up to boil under reflux. Reflux temperature was noted at 208° F. After one hour at reflux, the condenser was adjusted for distillation to eliminate water brought into the reaction as well as that produced by progressive condensation polymerization. 450 ml. of liquid were so collected in the receiver and the reaction was stopped as the temperature had slowly risen from an initial temperature of 208° to 240° F.

This resulted in a practically colorless, tough, rubbery thermoplastic solid. The resin had a very faint odor of formaldehyde and the films of the resin rapidly lose even this trace of odor. Such films may be applied as hot melts or cast from water or alcohol solutions, such as denatured alcohol, or a mixture of both. They are strongly adhesive to most any surface and feel dry to the touch if free from water or volatile solvents, but turn tacky when the surface is disturbed by friction, pressure, or heat. Its usefulness as a water-soluble and alcohol-soluble adhesive, hot-melt, or pressure sensitive adhesive is therefore apparent.

Variations of Examples 8 and 9 are possible by varying the hydroxyalkyl carbamates themselves or their proportions to simple urea. Thus, when employing glyceryl carbamate I obtain softer films or resin than when using hydroxyethyl or hydroxypropyl carbamates in like molar proportions. I obtain decreasing tackiness and fluidity as the ratio of simple urea to the hydroxyalkyl carbamates is increased.

These thermoplastic compounds are compatible with most water-soluble synthetic resins and plastic film formers. They are compatible with starches, gums, etc., for which they may serve as modifiers, to improve adhesion; they may be employed as tackifiers, as plasticizers, and to increase the solids concentration of the compatible resins without a marked increase in viscosity, therefore permitting the deposit of heavier film thicknesses in one coat. The relatively inexpensive make-up of these resins also serves to reduce the cost of most of such compositions, particularly where relatively high priced synthetic resins are involved.

The following is a partial list of synthetic resins which form clear films or show compatibility when compounded with the hydroxyalkyl carbamate resins, such as Examples 8 and 9; hydroxyethyl cellulose; methyl cellulose; carboxymethyl cellulose; polyvinyl alcohol; dimethyl hydantoin-formaldehyde resin; as well as most water-soluble formaldehyde condensation resins. The following will demonstrate, for instance, hydroxypropyl carbamate formaldehyde resin incorporated with polyvinyl alcohol.

Example 10

Water (tap or distilled) 870 grams; polyvinyl alcohol, 130 grams; hydroxypropyl carbamate formaldehyde resin of Example 9, 65 grams. The polyvinyl alcohol used in these tests was Elvanol 52–22, a product of duPont deNemours and Company having a medium viscosity and consisting of polyvinyl acetate hydrolyzed to the extent of 88%. The results were, tensile strength, 3,340 p.s.i.; elongationg 135° (Scott film tester at 75° F. 50% R.H.). The film is transparent, extremely flexible and leather-like.

Example 11

A solution was made up as above, but consisting of water, 870 grams; polyvinyl alcohol of like grade as in Example 10, 130 grams; hydroxypropyl carbamate-urea formaldehyde resin of Example 9, 65 grams. The viscosity of the total solution was not greater than the viscosity of a 13% solution of the polyvinyl alcohol itself, as measured on a Brookfield viscosimeter. The results were: total solids, 18.3%; tensile strength, 7,330 p.s.i. (Scott film tester at 75° F. 50% R.H.). This film is flexible, but much harder than the film of Example 10 and while it provides much greater tensile strength, it shows a considerably lower elongation.

While the above examples utilized formaldehyde in aqueous forms other forms of formaldehyde, or complexes of formaldehyde may be used, such as paraformaldehyde (trioxymethylene), or substances which, under the conditions of the reactions, yield formaldehyde such as hexamethylene tetramine and methylal which on decomposition at the reaction temperatures, will yield formaldehyde. For the purposes of my process and this disclosure they are equivalents of formaldehyde and are included in the term formaldehyde when used in the claims.

On the other hand, addition products of urea may be used instead of simple urea. I may use monomethylol urea, dimethylol urea, the glyoxal condensation product of urea, i.e., acetylenediurea (acetylenediurein), or the methylol derivatives of the same, an example being given below.

The acetylene diurein used in Example 12 below can be prepared as outlined in the Fiat Technical Bulletin T–44 and the Fiat Report No. 454 issued by the U.S. Government. Example 12 illustrates a method for producing resins of my invention employing this material.

Example 12

Acetylene diurein, 1 mole, 143 grams; formaldehyde, 5 moles (37% aqueous) 405 grams; and hydroxyethyl carbamate, 0.2 moles, 21 grams, were reacted at reflux and a pH of 8.9 obtained by the addition of 1.5 cc. N/1 NaOH solution, whereupon the pH was lowered to 4 by the addition of formic acid, and the reaction mass was continuously boiled under reflux for three hours. Top temperature was 207° F. The first, somewhat dim, solution was turned clear and remained clear upon cooling. The viscosity of the resin dispersion thus formed was low and measured 22 cps. at 26° C., Brookfield spindle No. 1.

Example 13

Acetylene diurein, 1 mole, 143 grams; formaldehyde (37% aqueous), 5 moles, 405 grams; hydroxyethyl carbamate, 1 mole, 105 grams, glacial acetic acid, 4 cc. were refluxed for one hour (temperature 208° F.) and a pH of 2.7. The apparatus was then adjusted for distillation and the product stripped of 225 cc. of distillate over a period of two and one-half hours, at a top temperature of 230° F. (batch temperature). At this temperature and state of stripping, there remains in the reactor a clear, amber, highly viscous fluid which, upon cooling, sets to a soft, tacky, resinous solid. Aqueous 50% solution of this resin is clear and of low viscosity, measuring approximately 20 cps. at 26° C., Brookfield spindle No. 1.

Resins having properties similar to the reaction products described under Examples 12 and 13 can be produced by reacting simple urea, glyoxal, hydroxyalkyl carbamates and formaldehyde stepwise. Thus, for example, I may first react the glyoxal and the urea under acid conditions and then add the hydroxyalkyl carbamate and formaldehyde to complete the reaction. However, I may mix all of the reaction components and react them simultaneously under acid conditions as specified in the above examples.

Example 14

A 13% polyvinyl alcohol solution (Elvanol 52–22, 88% hydrolyzed) was checked for viscosity with Brookfield spindle No. 1 at 4 r.p.m., measuring 2,150 c.p.s. at 26° C. To 900 grams of such solution containing 117 grams of polyvinyl alcohol were added 117 grams of a 50% solution of the resin described in Example 13. Although by such practice the solids content of the total solution is raised to above 17%, the actual viscosity measured in identical manner dropped to 1,700 cps. Tensile strength of film Example 14 measured 3,630 p.s.i. at 170% elongation. Such film is clear, flexible, and shows good adhesion to most surfaces and is not hygroscopic.

Example 15

A 10% solution of hydroxyethyl cellulose ("Cellosize WSL," low viscosity sold by Carbide and Carbon Chemical Co.) was modified with an equal weight portion (on dry weight) of resin Example 14. Film was cast on a polyethylene sheet and was clear and flexible. A specimen pulled on a Scott film tester at 26° C. and 50% relative humidity resulted in a tensile strength reading of 1,550 p.s.i.

While I have described a particular embodiment of my invention for the purpose of illustration, it should be understood that various modifications and adaptations thereof may be made within the spirit of the invention as set forth in the appended claims.

I claim:

1. A process for forming a condensation product of formaldehyde, a urea, and alkanol carbamates, which comprises heating to an elevated temperature a mixture of formaldehyde, a member chosen from the group consisting of urea, monomethylol urea, dimethylol urea, acetylenediurein and methylol derivatives thereof; and an alkanol carbamate having the constitutional formula

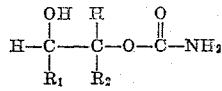

where the total carbon in the ester radical

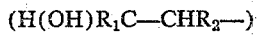

is at least two and not more than three and $R_1$ and $R_2$ are radicals chosen from the group consisting of hydrogen (H), methyl ($CH_3$) and methylol ($CH_2OH$) radicals, the ratio of the moles of formaldehyde to the total molar quantity of said member and alkanol carbamate being at least one and the mole ratio of the alkanol carbamate to said member being in the range of about .02 mols of carbamate to about 1 mol of said member and about 1.5 mols of carbamate to about 1 mol of said member.

2. A process according to claim 1 in which said mixture of formaldehyde, said member and carbamate contains water and has a pH of less than 7.

3. A process comprising acidifying the aqueous mixture produced according to the process of claim 1 to a pH of less than 7 and maintaining said acidified mixture at an elevated temperature to cause interpolymerization.

4. A process according to claim 1 in which said mixture of formaldehyde, said member and carbamate includes water and has a pH of more than 7.

5. A process according to claim 1 in which said mixture of formaldehyde, said member and carbamate contains water and has a pH of more than 7 and maintaining said mixture at an elevated temperature.

6. The process of claim 1 in which the ratio is in the range of about .02 moles of carbamate to about 1 mole of said member and about 1 mole of carbamate to about 1 mole of said member.

7. A process according to claim 6 in which said mixture of formaldehyde, said member and carbamate contains water and has a pH of more than 7.

8. A process according to claim 6 in which said mixture of formaldehyde, said member and carbamate contains water and has a pH of more than 7 and maintaining said mixture at an elevated temperature.

9. A process comprising acidifying the aqueous mixture produced according to the process of claim 6, to a pH of less than 7 and maintaining said acidified mixture at an elevated temperature.

10. A process according to claim 6 in which said mixture of formaldehyde, said member and carbamate includes water and has a pH of less than 7.

11. A condensation product of urea formaldehyde and an alkanol carbamate containing formaldehyde residues and a member chosen from the group consisting of urea, monomethylol urea, dimethylol urea, acetylenediurein and methylol derivatives thereof and alkanol carbamate units in which the mole ratios of the formaldehyde residues to the total moles of said member and carbamate residues being at least 1 and said carbamate residues being condensation residues of an alkanol carbamate having the constitutional formula

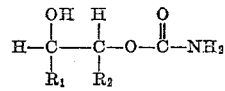

where the total carbons in the ester radical

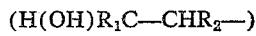

is at least 2 and is not more than 3 and $R_1$ and $R_2$ are radicals chosen from the group consisting of hydrogen (H), methyl ($CH_3$) and methylol ($CH_2OH$) radicals and in which the ratio of the radical units of carbamate to the radical units of said member is in the range of about .02 mols of carbamate units to 1 mol of the units of said member and about 1.5 mols of carbamate units to 1 mol of the units of said member.

12. The product of claim 11 in which the carbamate is hydroxyethyl carbamate.

13. The product of claim 11 in which the carbamate is hydroxypropyl carbamate.

14. The product of claim 11 in which the carbamate is glyceryl carbamate.

15. The product of claim 11 in which the ratio of carbamate units to units of said member is in the range of about .02 carbamate unit to about 1 unit of said member and about 1 carbamate unit to about 1 unit of said member.

16. The product of claim 15 in which the carbamate is hydroxyethyl carbamate.

17. The product of claim 15 in which the carbamate is hydroxypropyl carbamate.

18. The product of claim 15 in which the carbamate is glyceryl carbamate.

References Cited in the file of this patent

UNITED STATES PATENTS

| 2,226,202 | Hill et al. | Dec. 24, 1940 |
| 2,448,767 | Carlson | Sept. 7, 1948 |
| 2,518,444 | Baird et al. | Aug. 15, 1950 |

FOREIGN PATENTS

| 880,184 | France | Dec. 18, 1942 |
| 508,202 | Belgium | July 3, 1952 |